Figure 5:
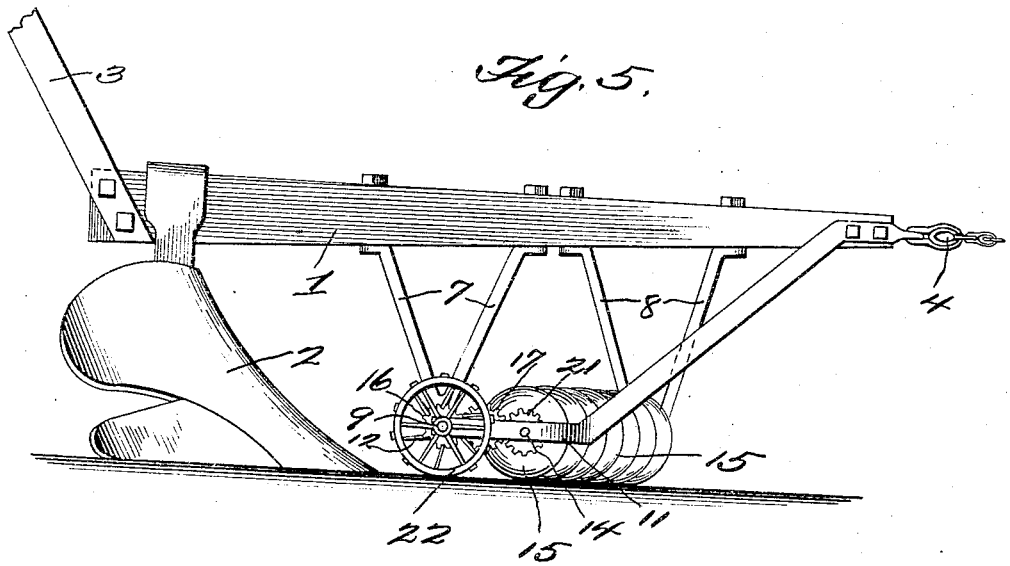

A. BANKHEAD.
PLOW ATTACHMENT.
APPLICATION FILED MAY 21, 1910.
978,427.
Patented Dec. 13, 1910.
2 SHEETS—SHEET 1.
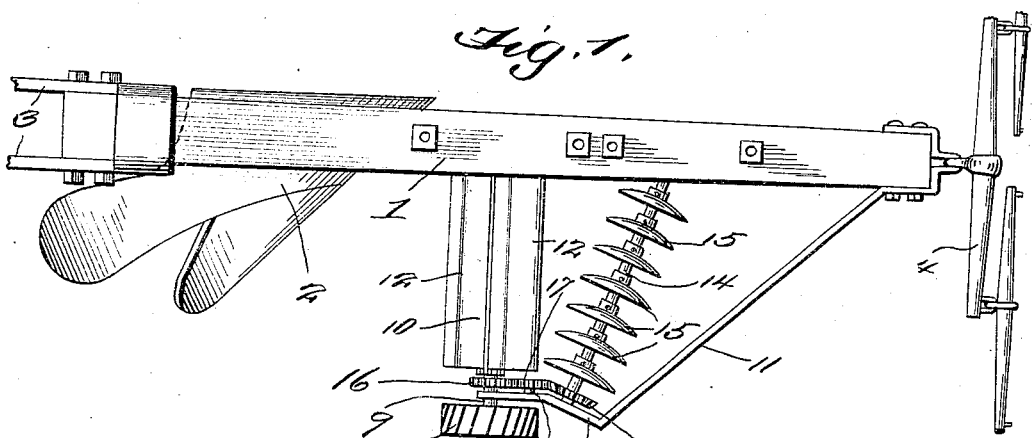
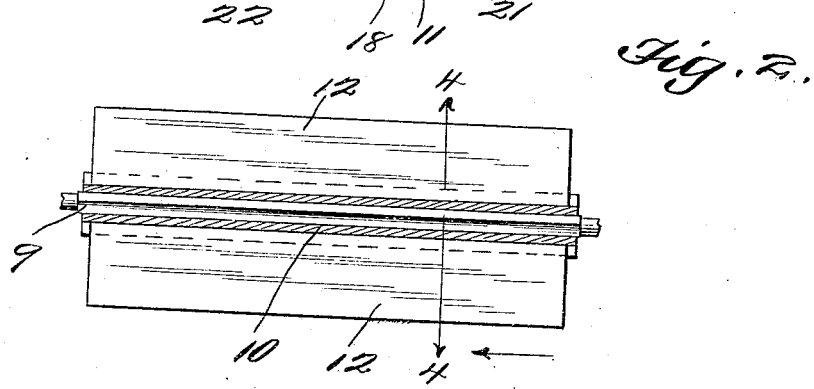
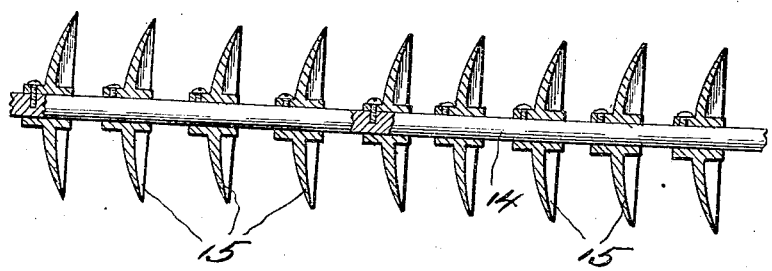
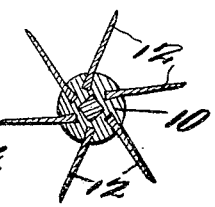
Witnesses
Francis T. Boswell
M. De Grange
Inventor
A. Bankhead
By D. Swift & Co.
Attorneys

A. BANKHEAD.
PLOW ATTACHMENT.
APPLICATION FILED MAY 21, 1910.

978,427.

Patented Dec. 13, 1910.
2 SHEETS—SHEET 2.

Witnesses
Francis G. Boswell
M. DeGrange

Inventor
A. Bankhead
By D. Swift & Co.
Attorneys

UNITED STATES PATENT OFFICE.

ALEXANDREW BANKHEAD, OF GLEN ULLIN, NORTH DAKOTA.

PLOW ATTACHMENT.

978,427.  Specification of Letters Patent.  Patented Dec. 13, 1910.

Application filed May 21, 1910. Serial No. 562,703.

*To all whom it may concern:*

Be it known that I, ALEXANDREW BANKHEAD, a citizen of the United States, residing at Glen Ullin, in the county of Morton and State of North Dakota, have invented a new and useful Plow Attachment; and I do hereby declare the following to be a full, clear, and exact description of the invention, such as will enable others skilled in the art to which it appertains to make and use the same.

This invention belongs to the art of plows, and it particularly pertains to a novel attachment for plows, whereby the soil and the clods thereof may be broken and worked more satisfactorily than heretofore. To attain this feature, the attachment is provided with a knife roller, which is located in advance of the plow, and located forwardly of the knife roller is a plurality of rotary disks or colters, which are designed to chop the soil and the clods thereof, in a plane parallel with the line of travel of the plow. The knife roller chops the soil and the clods thereof at right angles to the travel of the plow; thus it will be noted that the soil is thoroughly broken and worked by the knife roller and the disks or colters, and after being broken and thoroughly worked, the plow in the rear turns the furrow.

In the drawings, a certain form of device is disclosed, but in experimenting and reducing to practice this form of device, if the applicant finds it necessary to alter various parts thereof, for instance, the details of the structure, he is entitled to do so, provided the alterations fall within the scope of the appended claim.

Further features and combination of parts will be hereinafter set forth and referred to in the appended claim.

Figure 6:
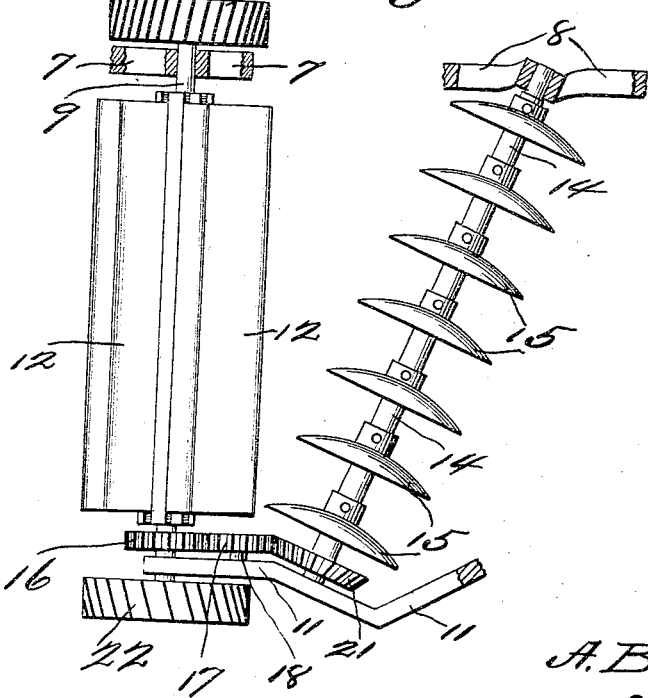

In the drawings:— Figure 1 is a plan view of a plow illustrating the attachment applied thereto. Fig. 2 is a side elevation of the plow, also showing the attachment applied. Fig. 3 is a detail view of the attachment removed from the plow. Fig. 4 is a transverse sectional view through the roller 10, on line 4—4 of Fig. 2 in order to illustrate the construction and connection of the knife blades 12. Fig 5 is a side elevation of the plow, showing the attachment. Fig. 6 is a plan view of the attachment detached from the plow showing parts in elevation and in section.

Referring to the drawings, 1 denotes the plow beam, and 2 represents the plow proper, while 3 designates the handles of the plow. The forward extremity of the plow beam is provided with the usual draft equalizer 4, whereby the plow may be drawn through the field.

Projecting downwardly from the beam 1, as at 5 and 6, are two projections or beams 7 and 8. Journaled in a bearing of the projection or beam 7 is one end of the spindle 9 (with which the roller 10 rotates), while the other end of the said spindle 9 is journaled in a bearing of an angularly disposed beam 11, which connects approximately at the forward portion of the plow beam 1. The roller 10 is provided with a series of elongated knife blades 12, which extend slightly tangentially of the roller, for instance in cross section.

Journaled in bearings of the projection or beam 8, and the angularly disposed beam 11 is a shaft 14, which is provided with a plurality of disks or colters 15, designed to rotate with the said shaft. On one end of the spindle of the roller a beveled gear 16 is fixed, which meshes with the beveled gear 17 of the shaft 18, on which a series of disks or colters 19 are fixed. This shaft 18 is geared with the shaft 14 by means of the beveled gears 20 and 21. Thus it will be observed that as the knife roller is revolved by means of the traction wheels 22 (which are carried by the spindle of the roller and designed to engage the ground), the various disks or colters are rotated in unison. By the provision of a device of this design it will be observed that the soil and the clods thereof will be easily worked and broken, sufficiently to be turned by the plow in the rear. It will be evident that the soil and the clods thereof will be approximately pulverized.

The invention having been described, what is claimed as new and useful is:—

In a plow attachment, the combination of a plow beam having downwardly projecting beams and an angularly arranged beam, of a plurality of rotating disks and a knife roller, shafts for the disks and the roller mounted in bearings of the downwardly projecting beams and the angularly disposed beam, said knife roller and disks being in advance of the plow, means for gearing the shafts to rotate in unison, means for causing the shafts to rotate, the knives of the roller being designed to cut and break the soil and the clods, said knives being disposed at right angles to said plow beam, and at an acute angle to the axle of the disks.

In testimony whereof I have signed my name to this specification in the presence of two subscribing witnesses.

ALEXANDREW BANKHEAD.

Witnesses:
JACOB BLETH,
FRIDRICH RÖTHER.